United States Patent

Shah et al.

[11] Patent Number: 5,267,758
[45] Date of Patent: Dec. 7, 1993

[54] FERRULE COUPLING HAVING A C-SHAPED INSERT

[75] Inventors: Dilip K. Shah, Madison, Wis.; Satish M. Chohan, Rockford, Ill.

[73] Assignee: The Gates Rubber Company, Denver, Colo.

[21] Appl. No.: 732,266

[22] Filed: Jul. 18, 1991

[51] Int. Cl.$^5$ .............................. F16L 33/22
[52] U.S. Cl. ...................... 285/256; 285/259; 29/516
[58] Field of Search ............... 29/235, 237, 282, 516, 29/517; 285/256, 382.7, 259, 330, 913, 243, 249, 382

[56] References Cited

U.S. PATENT DOCUMENTS

| | | | |
|---|---|---|---|
| 1,300,956 | 4/1919 | Greve | 285/259 |
| 1,745,295 | 1/1930 | Greve | 285/259 |
| 2,273,398 | 2/1942 | Couty et al. | 285/256 |
| 2,341,003 | 2/1944 | Watson | 285/256 |
| 2,460,653 | 2/1949 | Raybould | 285/256 |
| 2,464,416 | 3/1949 | Raybould | 285/259 |
| 3,497,890 | 3/1970 | Coyle | 72/168 |
| 3,837,686 | 9/1974 | Powell | 285/256 |
| 3,915,480 | 10/1975 | Kish et al. | 285/256 |
| 4,319,774 | 3/1982 | Kavick | 285/256 |
| 4,466,640 | 8/1984 | Van Houtte | 285/256 |
| 4,498,691 | 2/1985 | Cooke | 29/516 |
| 4,791,707 | 12/1988 | Tucker | 29/235 |

FOREIGN PATENT DOCUMENTS

| | | | |
|---|---|---|---|
| 238158 | 3/1960 | Australia | 285/256 |
| 595549 | 10/1925 | France | 285/249 |

OTHER PUBLICATIONS

European Patent Application No. 0241656, pub. date Oct. 21, 1987 Inventor: Tsuchiya.

*Primary Examiner*—David Jones
*Assistant Examiner*—Donald M. Gurley
*Attorney, Agent, or Firm*—H. W. Oberg; C. H. Castleman, Jr.; S. G. Austin

[57] ABSTRACT

A ferrule for attaching a hose end portion to a male-stem, the ferrule having a tubular socket portion that retains a bendable sleevelike insert having substantially a C-shape when viewed in cross-section. Oppositely facing circumjacent edges of the C-shaped insert may have teeth as a means for interdigitating with each other when the ferrule is used to couple hose.

11 Claims, 2 Drawing Sheets

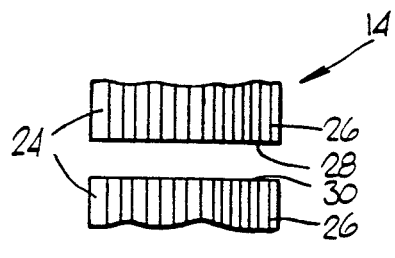
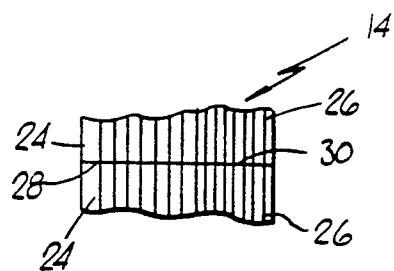
FIG.9  FIG.10
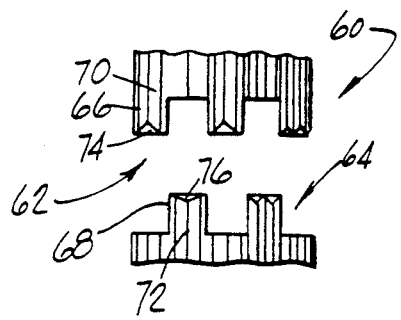
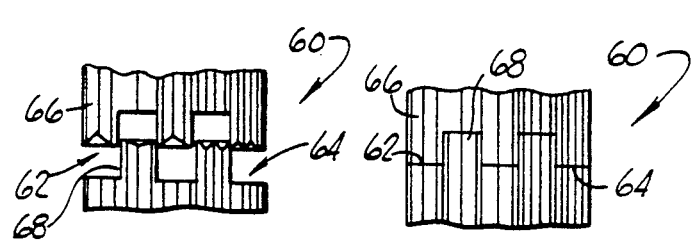
FIG 11  FIG.12  FIG.13
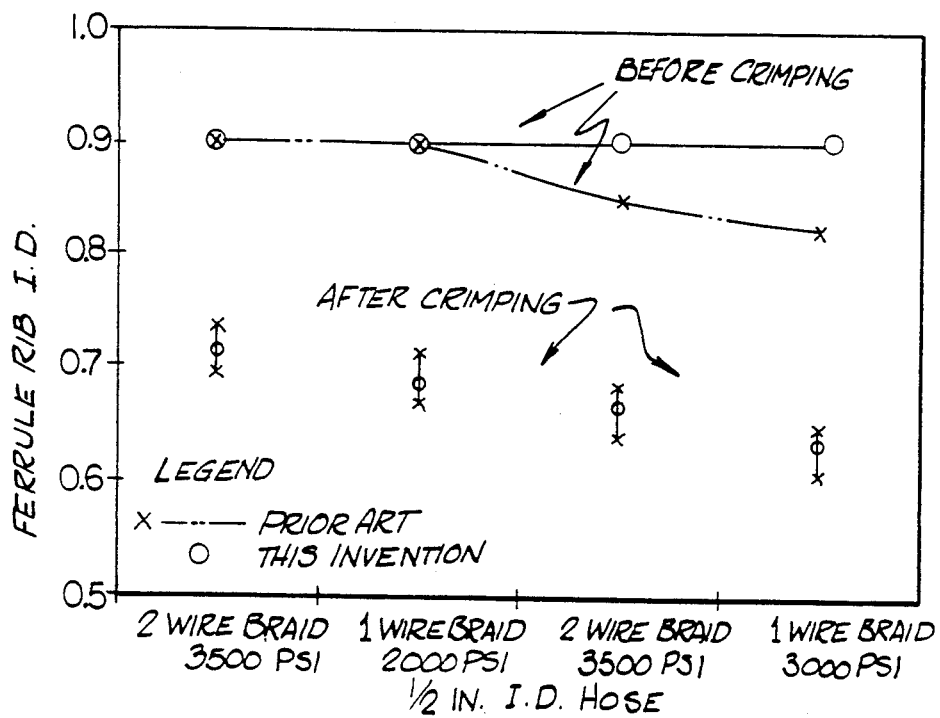
FIG.14

FERRULE COUPLING HAVING A C-SHAPED INSERT

BACKGROUND OF THE INVENTION

The invention relates to attachable couplings of the male-stem, ferrule type for use with reinforced, flexible hose but more particularly, the invention relates to a ferrule with an insert for gripping a hose end.

Couplings of the type that are post assembled to an end of a finished hose product typically have a male-stem portion that is insertable into a hose end and a ferrule that is concentric with the male-stem. Together, the male-stem and ferrule define an annular cavity for receiving a hose end. A coupling is retained by pinching the hose end in the annular cavity between the ferrule and stem such as by either radially reducing some part or element of the ferrule or by radially increasing the size of the male-stem.

Some couplings are of the reusable type and use a mechanical means of the coupling such as threaded members that activate means for pinching a hose against a stem. An example of such a reusable coupling appears in European patent 0 241 651 where a plurality of coaxial rings having alternating frustoconical surfaces are axially pressed together by a threaded member to wedge alternate rings radially inwardly. The so wedged rings pinch a hose against a stem. Such reusable couplings are usually expensive because the co-acting parts forming the coupling are typically machined from barstock. Furthermore, the amount of pinching cannot be precisely controlled for a range of hoses when the coupling is attached to a hose.

Crushable types of ferrules that may be of different sizes for different hose constructions having the same bore size are preferred for accurately controlling how an end of a hose is pinched. The present invention is directed to radially reducing the size of the ferrule by crushing it to a smaller diameter as by crimping using a plurality of circumjacently arranged die fingers.

Oftentimes, a serrated stem with a ferrule locking collar is used for high pressure hoses that are subjected to pressure impulses. For convenience of assembly, a ferrule may be pre-attached to a stem such as by crimping an end portion of the ferrule to the ferrule locking collar. While preattachment of a ferrule to a stem has advantages associated with reducing the number of parts for assembly to a hose, it introduces a disadvantage as to the number of parts required for a line of hose sizes because some hoses require the same size stem but different size ferrules. For example, three different size ferrules may be used with the same size stem for coupling .5 in. ID hose having different tube, reinforcement, and cover combinations. Consequently, some manufacturers prefer to select an appropriate ferrule for a hose when it is to be crimped on a hose so as to minimize inventory.

SUMMARY OF THE INVENTION

In accordance with the invention, a ferrule for use in attaching a hose end portion to a male-stem is provided where the ferrule has a crushable socket portion which retains a bendable sleevelike insert having substantially a "C" shape. The insert has means such as ribs formed along an inside surface for gripping a hose end. In another form of the invention, the sleevelike insert has a plurality of offset teeth at circumjacently spaced end portions of its "C" shape which teeth interdigitate with each other when the ferrule is used for attaching a hose end portion to a male-stem. The teeth accommodate a range of hose diameters and hose constructions.

The socket portion of the ferrule may be made by die casting, machining barstock, swagging preformed tubing, or stamping and deep drawing flat stock to form a tubular member.

The bendable sleevelike insert may be made by machining barstock, injection molding, extruding flat stock material and rolling it into a C-shape, or rolling a flat member into a strip and then bending it into a C-shape.

In use, the ferrule may be preattached to a male-stem and accommodate a range of hose outsized diameters and embedded, hose reinforcements such as wire braid. The insert when used bends to a substantially round shape in contrast to a polygonal shape of prior art ferrules of the crushable type. Another advantage of the invention is that leakage of hose effluent is minimized by eliminating potential leak paths formed at apexes of a polygon shaped ferrule when crimped.

These and other objects or advantages of the invention will be apparent after reviewing the drawings and description thereof wherein:

FIG. 9 is a developed partial, internal view taken generally in the direction of 9—9 of FIG. 2 and showing circumjacently, spacedapart edges of the C-shaped insert along its length;

FIG. 10 is a view similar to that of FIG. 9 but showing the circumjacently, spaced-apart edges of the C-shaped insert after crimping such as illustrated in FIG. 6;

FIG. 11 is a view similar to that of FIG. 9 but showing an alternate form of the C-shaped insert of the invention;

FIG. 12 is a view showing the insert of FIG. 11 after the coupling is crimped such as illustrated, in FIG. 6;

FIG. 13 is a view similar to FIG. 12 but showing the insert crimped to a smaller diameter; and FIG. 14 is a chart comparing prior art ferrule rib internal diameters with rib diameters for this invention.

DESCRIPTION OF PREFERRED EMBODIMENTS

Figure 1:
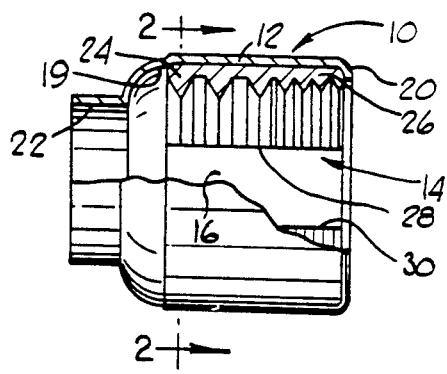
FIG. 1 is a side view of a ferrule made in accordance with the invention with the ferrule shown in one half axial crosssection.
Figure 2:
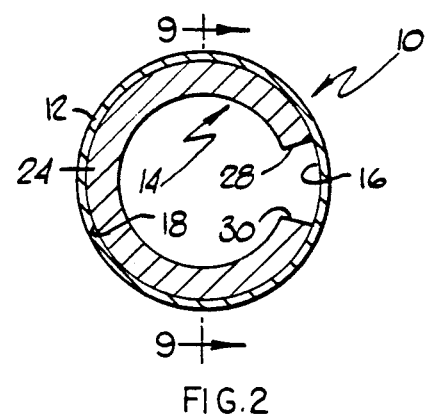
FIG. 2 is a view taken along the line 2—2 of FIG. 1 but showing the ferrule in full crosssection.

Referring to FIGS. 1 and 2, the ferrule 10 of the invention has a tubular socket portion 12 that retains an insert 14 as a means for gripping a hose end portion. The socket portion of the ferrule optionally has a cylindrical surface portion 16 and the insert has an outside cylindrical surface portion 18 where the cylindrical portions are positioned juxtaposed each other. The insert is retained in the socket by means of internal shoulder portions 19, 20 which have an inside diameter that is less than the outside diameter of the insert. The ferrule may optionally include a collar portion 22 as a means for pre or post attaching the ferrule to a locking collar of a male-stem. That part of the ferrule that includes the socket portion 12, may be made such as by machining from barstock, swagging or drawing a preformed tubular member, or by deep drawing and stamping flat sheet stock into a tubular shape. It is preferably formed from sheet stock for economical considerations.

The sleevelike C-shaped insert includes a means on its inside surface for gripping a hose end where such means are preferably in the form of a plurality of circumferentially oriented ribs 24, 26, where some of the ribs 24 may have a greater height than other ribs 26.

The insert may be made of any suitable material for gripping hose such as plastic, alloys with aluminum, and alloys with iron. The insert may be made by several different processes such as by machining it from barstock, injection molding it to a substantially C-shape shown in FIG. 4, or optionally and for economical reasons, it may be made from an elongate strip of material.

Figure 3:
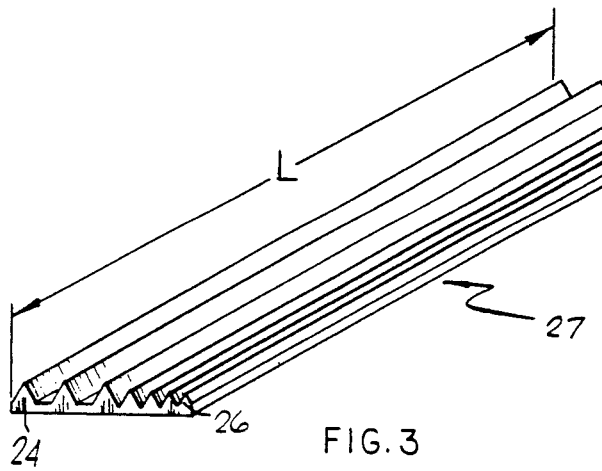
FIG. 3 is a partial isometric view showing an insert-preform of the invention.
Figure 4:
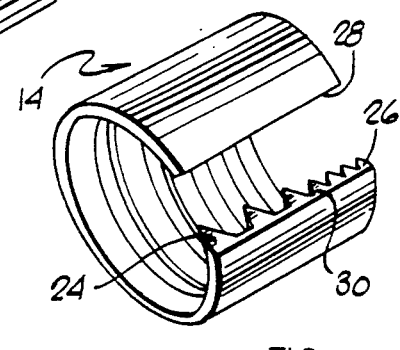
FIG. 4 is a view of the preform of FIG. 3 bent into a sleevelike C-shape as well as a sleevelike insert that is injection molded or machined.

Referring to FIGS. 3 and 4, an elongate strip of material may be formed such as by extrusion or rolling where the strip includes a plurality of substantially parallel ribs 24, 26 which have a desired height and become means for gripping an end portion of a hose. The elongate strip is severed to a desired length where the severed strip forms an insert-preform 27 having a length L equal to a desired circumferential length for the insert. The insert preform is rolled or bent into a C-shape as when viewed in crosssection, to define the insert with substantially circumferentially oriented ribs. The so formed insert has circumjacently spaced apart edges 28, 30 along its length. The spacing between the edges is predetermined to accommodate a hose diameter after the ferrule is crimped.

Figure 5:
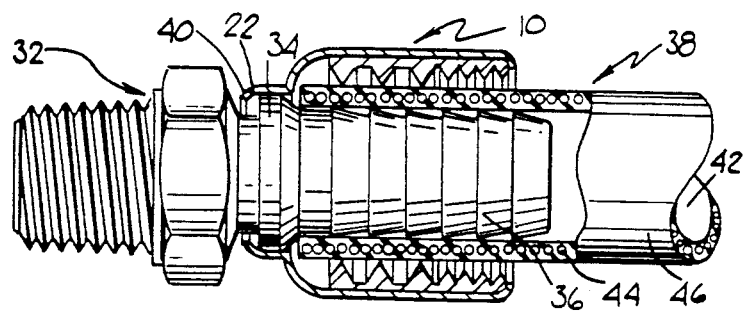
FIG. 5 is a partially cutaway and sectional sideview of a coupled hose assembly prior to ferrule crimping.
Figure 6:
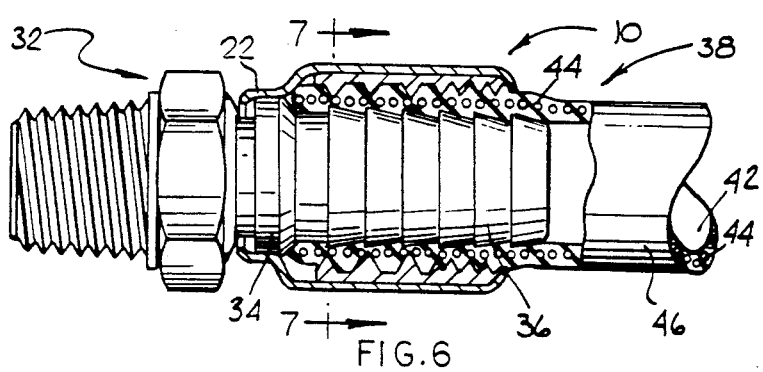
FIG. 6 is a view similar to that of FIG. 5 but showing the ferrule crimped onto a hose.

In service, the ferrule 10 of the invention is used with a male-stem 32 which may have a locking collar 34 and a serrated stem 36 for coupling a hose 38 as shown in FIGS. 5 and 6. A locking collar is typically used for hoses used in high pressure service applications. In lower pressure applications, the locking collar is not needed.

The ferrule may be prepositioned over and attached to the male-stem such as by crimping it to the locking collar of the stem. This positions the ferrule substantially concentric with the stem to define an annular hose-end cavity. Such crimping retains the ferrule by bending 40 the ferrule collar 22 behind the stem locking collar 34. Alternately, the ferrule and male-stem may be stocked as two separate pieces and later attached together when coupled to a hose during crimping.

Figure 8:
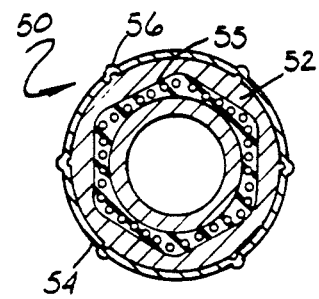
FIG. 8 is a view similar to FIG. 7 but showing a prior art coupling with ribs formed as an integral part of the ferrule.
Figure 7:
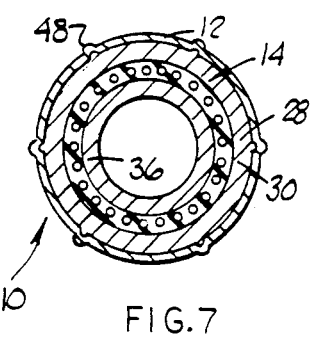
FIG. 7 is a cross-sectional view taken along the line 7—7 of FIG. 6.

A hose 38 having a tube 42, twined reinforcement 44, and cover 46 is pushed onto the serrated stem 36 as illustrated in FIG. 5. The ferrule is crushed as by crimping it with a plurality of circumjacently arranged die fingers of a crimping apparatus, not shown, where the so crimped ferrule is illustrated by FIGS. 6 and 7. As the socket portion is crushed, it slightly elongates as it is reduced in diameter. The socket portion presses radially inwardly against the sleevelike insert during the crushing process which bends the C-shaped member into substantially a round shape as shown in FIG. 7 even though the socket portion is distorted and includes a plurality of longitudinal ribs 48 formed of the socket portion and between adjacent die fingers during crimping. The circumjacently, spaced apart edges 28, 30 of the insert close together during the crimping operation whereby they, in some cases, may touch each other along their peripheral length. As shown in FIG. 7, the hose, and ribs formed of the insert, both bend and take a substantially round shape as does the hose, reinforcement, and cover of the hose. In contrast, and as illustrated by the prior art ferrule 50 of FIG. 8, integral ribs 52 formed of a socket portion 54 distort to a substantially polygonal shape where the number of sides of the polygon are equal to the number of die fingers used in the crimping process. A straight side 55 of a polygon is formed juxtaposed a longitudinal rib 56 which is formed during the crimping process. It is believed that the apexes of the polygon and reinforcement form leak paths for seepage of hose effluent.

The developed partial views of FIGS. 9 and 10 are illustrative of how the circumjacently spaced apart edges 28, 30 of the sleevelike insert 14 are initially separated (FIG. 9) before the ferrule is crimped and how the circumjacent edges 28, 30 come together (FIG. 10) as the socket portion is crushed as by crimping and the sleevelike insert is simultaneously bent to substantially a round shape around a hose end portion.

The developed partial views of FIGS. 11, 12 and 13 are illustrative of a preferred embodiment for a C-shaped sleevelike insert 60 of the invention where circumjacently spaced apart edges 62, 64 are in the form of spaced square cut teeth where teeth 66 of one edge are offset from circumjacently spaced apart teeth 68 of the other edge. As particularly illustrated in FIG. 11, it is also preferred that a complete portion of one or more ribs 70, 72 are formed as part of each tooth. Also, the so formed rib portion of each tooth may be chamfered 74, 76. The angle of the chamfer may optionally be chosen so that when the insert is bent to a round shape, the chamfer generally mates with the opposite edge of the sleeve. More importantly, the chamfer inhibits the insert from gouging the hose during the crimping process as the insert is bent to a round shape.

The offset teeth define a means for interdigitating with each other and advantageously provide the ferrule with a crimp range to grip hose end portions that would otherwise require several different ferrules due to variations of hose constructions. FIG. 12 is illustrative of how the teeth interdigitate with the other as the socket portion is crushed and the insert is bent to a first crimping diameter of a range of crimping diameters. As illustrated, the teeth partially overlap each other. For a minimum crimping diameter, the teeth may fully interdigitate with each other so that the peripheries of the circumjacently spaced end portions are in complete contact with each as illustrated in FIG. 13.

To illustrate one advantage of the invention of FIGS. 11-13 over that of the prior art, four different 0.5 inch ID hoses were coupled with the same type of male-stem and three different prior art ferrules having different internal rib diameters. Referring to FIG. 14, the four types of hoses were: 2 wire braid, 3500 psi; 1 wire braid, 2000 psi; 2 wire braid, 3500 psi; and 1 wire braid, 3000 psi. Before coupling, two of the prior art ferrules had a minimum rib diameter of 0.906 in. while the other prior art ferrules had internal rib diameters of 0.863 in. and 0.830 in. respectively. The coupling of the invention had a minimum rib diameter of 0.906 in.

The hoses were coupled with a stem and ferrule by crimping the ferrules to their recommended crimp outside diameter. After crimping, the minimum ferrule rib diameter was measured. In the case of the prior art ferrules, the minimum diameter between the polygonal flats of the ribs was measured as well as the larger diameter that occurs between the polygonal apexes. As shown on FIG. 14, the range between the diameters for the flats and apexes of polygonal shape is approximately 0.05 in. for each hose type. The same hose types were coupled with the ferrule of the invention and the same type of prior art stem where the ferrule was crimped to its previously determined (by test) most effective outside diameter; afterwards, the minimum inside diameter of the rib was measured for each of the four hose types.

The insert of the present invention was bent to a substantially round shape during crimping for each of the hoses to the diameters shown on FIG. 14. As charted the minimum diameter for the present invention falls approximately about in the middle of the range for each of the prior art ferrules. All hoses were coupled using the same type of male-stem which included a locking collar as illustrated in FIGS. 5 and 6. The hoses coupled with the ferrule of the present invention were pressure tested at 4,666 psi for over 1 million cycles where the ferrules exhibited substantially very little or no leakage during the test. Accordingly, one ferrule of the present invention was used to couple four different hose types where previously, three separate ferrules were used. This emphasizes another advantage of the invention and that is that a fewer number of ferrules need be inventoried to accommodate several different types of hoses.

The reason that the ferrule of the invention may accommodate a range of hose sizes with little or no leakage is believed to be partially a result of the substantially rounded shape of the sleevelike insert after crimping; also, the rounded shape in combination with interdigitating teeth of the insert member permits several hose types to be accommodated with the same ferrule. In contrast, the prior art ferrules do not bend to a round shape, but rather, are bent to a polygonal shape as the socket is crushed as by crimping.

The foregoing detailed description is made for purpose of illustration only and is not intended to limit the scope of the invention which is to be determined from the appended claims:

What is claimed is:

1. In a ferrule of the radially crushable type for attaching a hose end portion to a male-stem without the application of an axial force generated by a thread means, the ferrule having a tubular socket portion that retains at least one "C" shaped insert for gripping hose end portion and wherein the improvement comprises:
    a crushable socket portion defining a means for bending the insert to a range of crimping diameters:
    a C-shaped sleeve like insert disposed in the socket portion and having circumjacently spaced end portions with offset teeth extending in a circumferential direction from the end portions that define means for interdigitating with each other and defining a range of hose end portion gripping positions as the insert is roundly bent by the crushable socket portion and
    means formed along an inside surface of the insert for gripping a hose end.

2. The ferrule as claimed in claim 1 wherein the end portions are in the form of spaced, square cut teeth where teeth of one edge are offset from circumjacently spaced teeth of the other edge.

3. The ferrule as claimed in claim 2 wherein the gripping means includes a plurality of axially spaced apart, and circumferential ribs formed of the inside surface portion of the sleevelike insert.

4. The ferrule as claimed in claim 3 wherein a complete portion of a rib is formed as part of each tooth.

5. The ferrule as claimed in claim 4 wherein the portion of a rib formed as part of each tooth is chamfered.

6. The ferrule as claimed in claim 1 wherein the socket portion has an inside cylindrical surface portion at an inside diameter and inside circumference, and the insert has an outside cylindrical surface portion juxtaposed the inside cylindrical surface portion of the socket at an outside diameter and outside circumference.

7. The ferrule as claimed in claim 6 wherein the insert is retained in the socket by means of internal shoulder portions formed of the ferrule at opposite axial ends of the insert, the shoulder portions at inside diameters that are less than the outside diameter of the insert.

8. The ferrule as claimed in claim 1 which further includes means of the socket portion for attaching the ferrule to a male-stem.

9. The ferrule as claimed in claim 1 wherein the insert is made of a material selected from the group consisting of plastic, alloys with aluminum, and alloys with iron.

10. A "C"0 shaped insert for a hose fitting with a socket portion crushable radially inwardly comprising:
    a C-shaped sleeve like body having an outside cylindrical surface throughout its length, circumjacent end portions and oppositely axially facing ends wherein the circumjacent end portions include a plurality of square cut teeth extending in a circumferential direction from the end portions where teeth of one circumjacent end portion are offset from teeth of the other circumjacent end portion and define a means for interdigitating with each other and defining a range of gripping positions as the insert is bent by the socket portion crushed radially inwardly; and
    a plurality of circumferentially oriented rib portions oppositely facing in relation to the outside cylindrical surface and having a height and integrally formed of the body along an inner surface of the body.

11. The insert as claimed in claim 10 wherein the rib portions near one axial end of the insert have a height that is greater than the height of the ribs near the oppositely axially facing end of the insert.

* * * * *